R. M. & J. M. BROOKS.
Sirup Evaporator and Skimmer.
No. 206,532. Patented July 30, 1878.
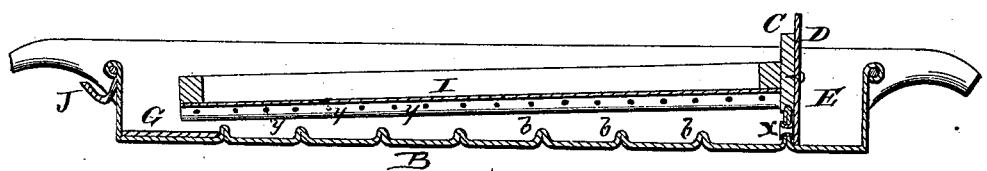
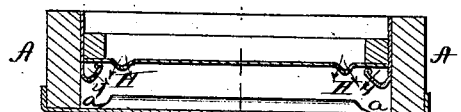
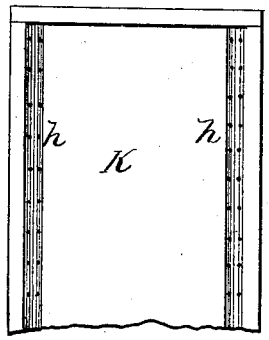
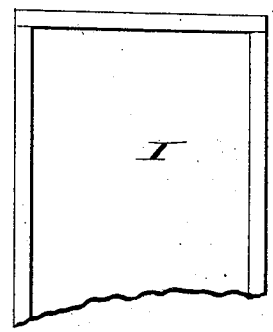
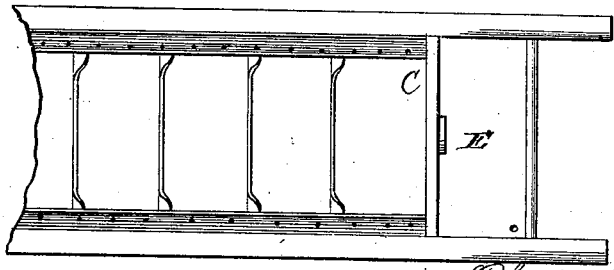

UNITED STATES PATENT OFFICE.

RHODOM M. BROOKS AND JAMES M. BROOKS, OF JENKINSVILLE, GEORGIA.

IMPROVEMENT IN SIRUP EVAPORATORS AND SKIMMERS.

Specification forming part of Letters Patent No. 206,532, dated July 30, 1878; application filed January 16, 1878.

*To all whom it may concern:*

Be it known that we, RHODOM M. BROOKS and JAMES M. BROOKS, of Jenkinsville, in the county of Pike, and in the State of Georgia, have invented certain new and useful Improvements in Sirup-Evaporators and Self-Skimmers; and do hereby declare that the following is a full, clear, and exact description thereof, reference being had to the accompanying drawings, and to the letters of reference marked thereon, making a part of this specification.

The nature of our invention consists in the construction and arrangement of a sirup evaporator and skimmer, as will be hereinafter more fully set forth.

In order to enable others skilled in the art to which our invention appertains to make and use the same, we will now proceed to describe its construction and operation, referring to the annexed drawing, in which—

Figure 1 is a longitudinal section, and Fig. 2 a transverse section, of our evaporators. Figs. 3, 4, and 5 are detailed views of parts thereof.

A A represent the side bars of the pan, to which the bottom B is secured.

$b\ b$ are low cross-bars, of either wood or metal, to support and strengthen the bottom. These bars are low, in order that the juice may pass over them, thereby causing agitation of the juice, which makes the scum rise better. If these bars are crimped from the metal of the bottom B they are flattened down at each end, as shown at $a\ a$, in order that the bottom of the pan may be turned upon the side bars A A, as shown in Fig. 2.

C is a wooden or metal bar, let into and extending to the top of the side bars. This bar is provided with a hole, $x$, to allow the juice to pass into a small division, E, of the pan. If this bar is crimped, then, to prevent leakage, an eyelet is put in the hole $x$, as shown in Fig. 1, thereby dispensing with the use of rivets or solder.

D is a gate, which works on a pivot, to allow or prevent the passage of juice through the hole $x$.

At the front end of the pan, a little above the bottom B, is an inner bottom, G, which makes a cooling-surface for the juice on top, no matter how intense it may be heated beneath.

H H are troughs extending from the bar C on each side, slightly descending to the cooling-surface G. Along the upper edges of these troughs are holes $y$, through which, by rapid boiling, the juice will be forced and conveyed to the cooling-surface G, where the scum may be taken off at leisure, thus saving much labor.

I is a tight lid, covering almost the entire surface of the juice, leaving only the cooling-surface G at the front end for the accumulation of the scum, and the space from the bar C to the back end, to see when the sirup is done. This lid is made to fit to the bar C and side bars A A, leaving no place for the steam to escape except at the front end, and as the scum always rises to the top of the juice, it will be instantly forced, by the escape of the steam, to the cooling-surface G, where it will continue to collect, if not taken off, until it fills up and runs over into the trough J, in which it can be conveyed to any place.

In place of the tight lid I we use a lid, K, provided with perforated troughs $d\ d$ on the sides, through which a portion of the scum will be forced, and conveyed to the front end. The remainder of the scum will be forced from under the lid by the escaping steam, as it is by the lid I.

The invention can be applied to a kettle by cutting a slot in the lid, and providing the same with a trough, into which the juice will be forced by the escaping steam.

Having thus fully described our invention, what we claim as new, and desire to secure by Letters Patent, is—

The within-described evaporating-pan, consisting of the side bars A A, bottom B, having the low cross-bars $b$ formed therewith, division E, partition C, with aperture $x$, and gate D, the perforated troughs H H, and a lid covering nearly the entire pan, all constructed substantially as and for the purposes herein set forth.

In testimony that we claim the foregoing we have hereunto set our hands and seals this 19th day of December, 1877.

RHODOM M. BROOKS. [L. S.]
JAMES M. BROOKS. [L. S.]

Witnesses:
J. M. MASON,
W. R. MANGHAM.